Figure 1:
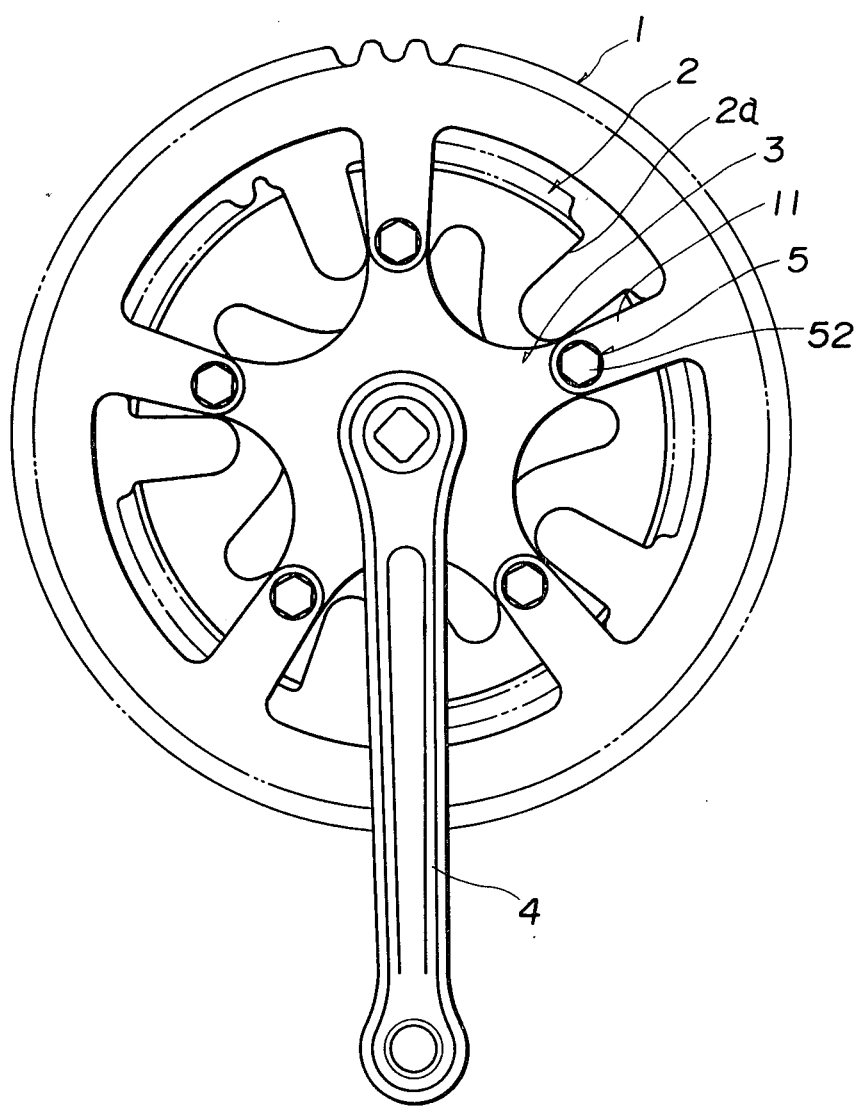

United States Patent [19]

Segawa

[11] 4,106,357
[45] Aug. 15, 1978

[54] MULTISTAGE GEAR CRANK FOR A BICYCLE

[75] Inventor: Takashi Segawa, Sakai, Japan

[73] Assignee: Shimano Industrial Company Limited, Osaka, Japan

[21] Appl. No.: 751,443

[22] Filed: Dec. 16, 1976

[30] Foreign Application Priority Data

Dec. 29, 1975 [JP] Japan .............................. 50-180305[U]

[51] Int. Cl.² ....................... F16H 55/30; B21D 53/26
[52] U.S. Cl. ............................... 74/243 DR; 29/159 R
[58] Field of Search ....................... 74/243 DR, 217 B; 29/159 R

[56] References Cited

U.S. PATENT DOCUMENTS

| 3,785,219 | 1/1974 | Anthamatten | 74/217 B |
| 3,813,955 | 6/1974 | Huret et al. | 74/217 B |
| 3,901,095 | 8/1975 | Wechsler | 74/217 B |

*Primary Examiner*—Leonard H. Gerin
*Attorney, Agent, or Firm*—Stevens, Davis, Miller & Mosher

[57] ABSTRACT

A multistage gear crank for a bicycle, comprising at least two chain gears and a crank body, which chain gears together with a mounting plate for mounting the two gears to the crank body are formed by punching only one metallic sheet.

2 Claims, 5 Drawing Figures

MULTISTAGE GEAR CRANK FOR A BICYCLE

This invention relates to a multistage gear crank for a bicycle, and more particularly to a multistage gear crank comprising at least two chain gears regularly spaced to be fixed to a crank body.

Generally, this kind of multistage gear crank, hitherto well known, is made up of a pedalling means comprising a crank shaft, a crank body without chain gears, and a pair of pedals mounted to the crank body and that of the aforesaid multistage gear crank.

The multistage gear crank constructed as aforesaid has two or more chain gears attached to the crank body in a well known manner, i.e., a mounting plate having a plurality of legs extending outward radially of the crank body is formed integrally with the boss of the crank body, to which plate the chain gears are connected. The larger diameter chain gear of the gears is fixed to the boss of the crank body and then connected to the smaller diameter chain gear.

There are problems, however, in that in the former case the chain gears, which are required to be formed in ring-like shapes, must suffer the loss of the remainder of the metal sheet after punching when formed from one sheet, whereby the material cost increases to that extent as well as complicated processes are required to produce the crank body. As a result the gear crank is expensive to manufacture, and in the case of the larger diameter chain gear, which is caulked to be fixed to the crank body, it often should be exchanged for a new one together with the crank body. In view of the aforesaid problems, this invention has been designed. A main object of the invention is to provide a multistage gear crank economically and inexpensively, to make the crank body easy to produce and also to allow two or more chain gears and mounting plate to be formed from one sheet, thereby restricting the manufacturing cost and eliminating the wasteful remainder after punching. Another object is to provide a multistage gear crank capable of permitting the renewal of only one chain gear without exchange of the whole while the aforesaid object is obtainable.

In greater detail, the larger diameter chain gear ring-like shaped is provided with a plurality of mounting portions extending radially inwardly of the chain gear, while the smaller diameter chain gear is provided at its center with a through hole contoured similarly to a mounting plate which has as many legs as the mounting portions of the larger diameter chain gear and a plurality of cutouts at the outer periphery contoured similarly to the mounting portions respectively thus the remainder of the metallic sheet punched for deriving the larger diameter chain gear may be utilized in the formation of the smaller chain gear and after deriving the smaller chain gear the mounting plate too may be formed from the remainder. Thus one metallic sheet is utilized in the formation of two chain gears and a mounting plate which fixes the gears to the crank body.

Accordingly the multistage gear crank of the invention has made it possible to reduce drastically the wasteful remainder and thus save the material previously lost. Also the mounting plate, which is formed separately from the crank body, can eliminate the difficulty of requiring complicated processes for producing the crank body. Further the chain gear, which is fixed to the crank body through the mounting plate, is desirably changeable to a selective new one.

Figure 2:
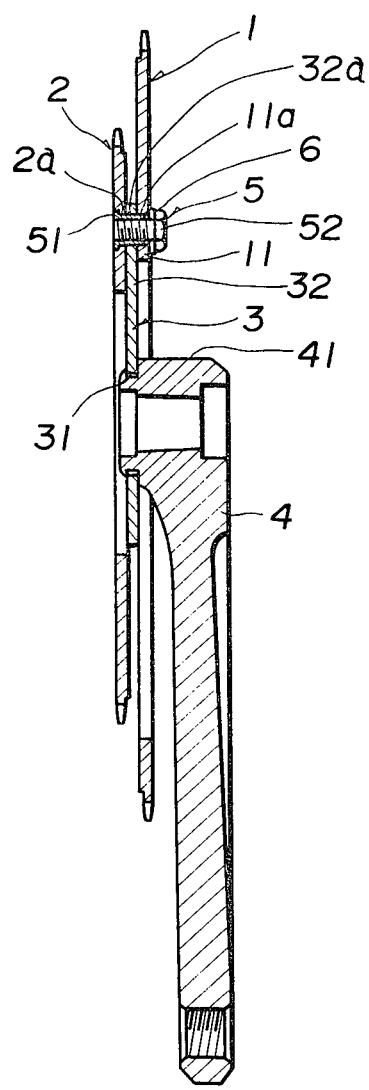
Figure 3:
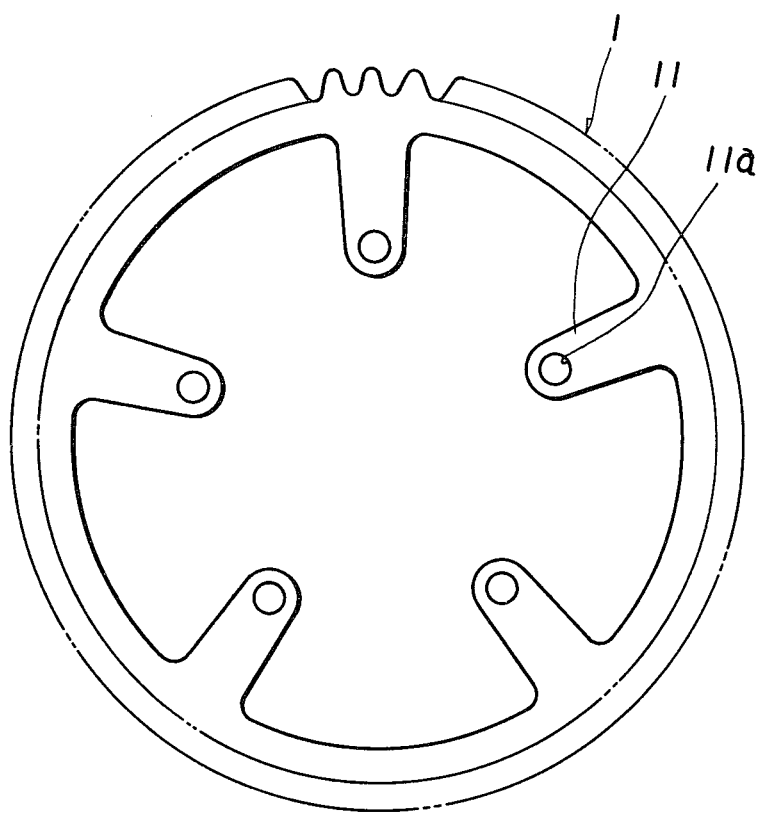
Figure 4:
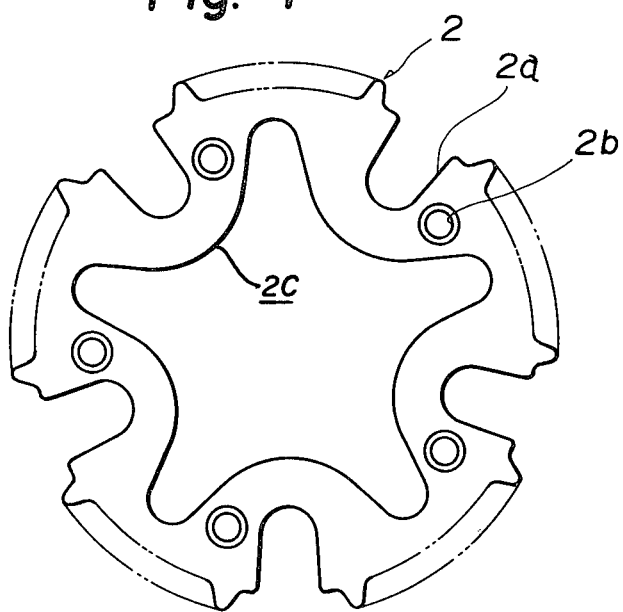
Figure 5:
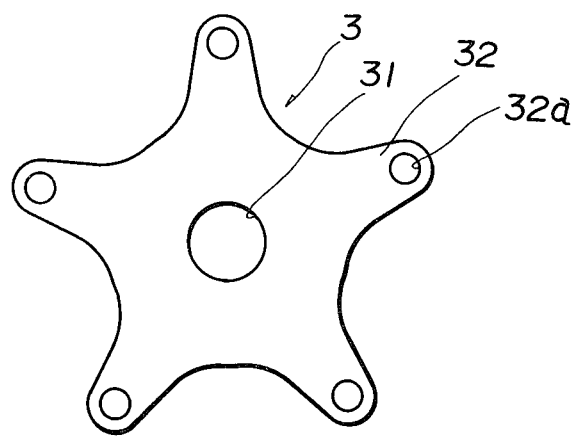

These and other objects of the invention will be apparent from the following description of an embodiment in accordance with the accompanying drawings, in which FIG. 1 is a front view of a typical embodiment of the multistage gear crank of the invention, FIG. 2 is a longitudinal section at the center line thereof, FIGS. 3 to 5 being exploded views of components of gear crank in FIG. 1, FIG. 3 is a front view of the larger diameter chain gear, FIG. 4 is a front view of the smaller diameter chain gear, and FIG. 5 is a front view of the mounting plate.

Referring to the drawings, the embodiment of the invention shows a multistage gear crank comprising two chain gears 1 and 2, connected by a mounting plate 3 and fixed to a crank body 4.

Chain gear 1 of the two is larger in pitch diameter and has the greater number of teeth than chain gear 2.

Chain gear 1 as shown in FIG. 3, is ring shaped and, as seen from FIG. 1, has an inner diameter of said ring larger than the diameter of the addendum circle of chain gear 2.

Chain gear 1 has on its inner periphery a plurality of mounting portions 11 (five portions in the drawing) narrow in width, uniformly spaced and extending toward the center of the chain gear, the mounting portions having at the tips thereof mounting bores 11a respectively.

Chain gear 2 as shown in FIG. 4, has at the center thereof a through hole 2c contoured similarly to mounting plate 3 shown in FIG. 5. At the outer periphery chain gear 2 has cutouts 2a contoured similarly and corresponding to mounting portions 11, and at substantially radially intermediate portions mounting bores 2b corresponding to mounting bores 11a.

Mounting plate 3, as shown in FIG. 5, has a bore 31 engageable with the outermost end of a boss 41 of crank body 4. Around bore 31 of mounting plate 3 are formed outwardly radially extending legs 32 corresponding to the inner contour of chain gear 2. Each of the legs 32 has at the tip thereof a bore 32a the total of which corresponds in number and position to mounting bores 11a and 2b.

The aforesaid larger diameter chain gear 1, smaller diameter chain gear 2 and mounting plate 3 are formed by punching one metallic sheet. The metallic sheet has its diameter equal to or slightly larger than the outer diameter of larger diameter chain gear 1, and punched at the outer circumferential portion to form larger diameter chain gear 1. From the remainder after the aforesaid punching is performed smaller diameter chain gear 2 is punched. Cutouts 2a of smaller diameter chain gear 2 result from vestiges of punched mounting portions of larger diameter chain gear 1. The teeth of smaller diameter chain gear 2 are formed at the outer periphery thereof except at cut-outs 2a. Although cutouts 2a lack teeth, there is no hindrance in transmitting the driving force by pedalling from the gear to the freewheel at rear wheel of the bicycle. The gear because of the cutouts is made lighter.

The remainder of the metallic sheet after the smaller diameter chain gear 2 is punched is utilized to form mounting plate 3. The material for legs 32 is derived from cutout 2c. Thus one metallic sheet is effectively used to reduce wasteful remainders, thereby making the multistage gear crank of the invention inexpensive to manufacture.

Chain gears 1 and 2, as shown in FIG. 2, are preferably fixed to both sides of legs 32 of mounting plate 3. The fixing is accomplished by connecting a flanged collar 51 threaded at its inner periphery with a threaded bolt 52. Collar 51 is inserted into the leg bore 32a of the mounting plate 3 from the smaller diameter chain gear side and the bolt 52 is inserted from the larger diameter chain gear side through a washer 6 after which the collar and bolt are screwed together thereby fixing both the gears 1 and 2 to the legs 32.

In addition, the mounting plate 3 fixed to both chain gears 1 and 2, also is fixed to the boss 41 of crank body 4 in a manner such that the bore 31, as shown in FIG. 2, inserted into the outermost end of the boss 41, and thereafter the boss 41 is caulked to be deformed so as to be fixed to the gears.

As clearly understood from the abovementioned description, the multistage gear crank of the invention, is formed from two or more chain gears having a differently number of teeth and a mounting plate supporting the gears is made by punching one metallic sheet, so that the metallic sheet may be effective to reduce material loss in the formation of the components resulting in the making of the multistage gear crank as a whole inexpensive to manufacture. On the other hand, the attachment of separate gears to the mounting plate permits only one gear to be exchanged when the number of teeth is required to be changed or a damaged gear is renewed, thereby considerably improving the carrying out the exchange.

While an embodiment of the invention has been shown and described, the invention is not limited to the specific construction thereof, which is merely exemplified in the specification rather than defined.

What is claimed is:

1. A multistage gear crank for a bicycle, comprising at least two chain gears of different pitch diameters, a mounting plate for connecting said chain gears at a regularly spaced interval therebetween by means of a fixing means, and a crank body having a boss to which said mounting plate is fixed; said larger diameter chain gear being ring shaped, having an inner diameter larger than the diameter of the addendum circle of the smaller diameter chain gear, and having a plurality of mounting portions extending radially from the inner periphery of said larger diameter chain gear; each mounting portion being provided at its end with a mounting bore; said mounting plate having at its center a bore engageable with said boss of the crank body and at its periphery legs which are as many in number as said mounting portions, said legs having bores at the ends thereof; said smaller diameter chain gear having at its center a through hole contoured similarly to said mounting plate, peripheral cutouts contoured similarly to said mounting portions of the larger diameter chain gear, and at substantially radially intermediate portions mounting bores as many in number as said mounting portions, said bores in said larger diameter chain gear, said smaller diameter chain gear and said mounting plate being coincidental.

2. The multistage gear crank for the bicycle as set forth in claim 1, wherein said larger and smaller diameter chain gears are brought into contact with both sides of said legs of the mounting plate so as to be fixed thereto by said fixing means.

* * * * *